(12) United States Patent
Gordon et al.

(10) Patent No.: US 7,371,028 B2
(45) Date of Patent: May 13, 2008

(54) POST MOUNTING SYSTEM

(75) Inventors: Marcel A. Gordon, Los Angeles, CA (US); Christopher C. Haarhoff, Los Angeles, CA (US); George K. Paddock, Los Angeles, CA (US)

(73) Assignee: George Paddock II, Inc., North Hollywood, CA (US)

( * ) Notice: Subject to any disclaimer, the term of this patent is extended or adjusted under 35 U.S.C. 154(b) by 0 days.

(21) Appl. No.: 10/423,479

(22) Filed: May 1, 2003

(65) Prior Publication Data

US 2004/0217240 A1 Nov. 4, 2004

(51) Int. Cl.
*B25G 3/20* (2006.01)

(52) U.S. Cl. ............... 403/373; 403/87; 248/124.2

(58) Field of Classification Search ............... 248/404, 248/406.1, 410, 411, 218.4, 219.1, 121, 122.1, 248/124.2, 125.8; 411/354; 285/302, 298, 285/275, 145.1, 145.2, 301; 403/1, 7, 21, 403/87, 110, 256, 373; 352/243; 396/425, 396/428, 419, 420
See application file for complete search history.

(56) References Cited

U.S. PATENT DOCUMENTS

| 3,802,242 | A | * | 4/1974 | Svagr | 72/225 |
| 3,825,948 | A | * | 7/1974 | Hendershot et al. | 360/16 |
| 4,017,168 | A | | 4/1977 | Brown | 352/243 |
| 4,156,512 | A | | 5/1979 | Brown | 248/586 |
| 4,158,489 | A | * | 6/1979 | Gottschalk et al. | 352/243 |
| 4,208,028 | A | | 6/1980 | Brown et al. | 224/185 |
| 4,378,172 | A | * | 3/1983 | Groschupp | 403/104 |
| 4,394,075 | A | | 7/1983 | Brown et al. | 352/243 |
| 4,474,439 | A | | 10/1984 | Brown | 352/243 |
| 4,496,228 | A | * | 1/1985 | Schmidt | 396/428 |
| 4,530,584 | A | * | 7/1985 | Schmidt | 396/428 |
| 5,011,104 | A | * | 4/1991 | Fang | 248/125.8 |
| 5,275,364 | A | * | 1/1994 | Burger et al. | 248/125.1 |
| 5,579,071 | A | * | 11/1996 | Wetzel et al. | 352/243 |
| 5,752,112 | A | | 5/1998 | Paddock et al. | 396/421 |
| 5,797,054 | A | | 8/1998 | Paddock et al. | 396/421 |
| 5,823,578 | A | * | 10/1998 | Chiou | 285/38 |
| 5,839,704 | A | * | 11/1998 | Appleman | 248/178.1 |
| 5,924,658 | A | * | 7/1999 | Shiery et al. | 248/125.8 |
| 6,030,130 | A | | 2/2000 | Paddock et al. | 396/421 |
| 6,145,893 | A | * | 11/2000 | Kuo | 285/302 |
| 6,347,892 | B1 | | 2/2002 | Paddock et al. | 396/421 |
| 6,634,822 | B1 | * | 10/2003 | Wang | 401/137 |

\* cited by examiner

*Primary Examiner*—A. Joseph Wujciak, III
(74) *Attorney, Agent, or Firm*—Connolly Bove Lodge & Hutz LLP

(57) ABSTRACT

A post mounting system for a body mounted camera mounting system includes a grip to go about the post of the system and a vernier clamp. The vernier clamp includes a vernier ring which is slidable axially and fixed angularly to the grip. A vernier nut threadably engages the grip and is rotatable on the vernier ring. A clamp ring is integrally formed with the vernier ring and is castellated to be compressible against the post extending through the device. A split clamp ring cooperates with a cam lever for easy clamping of the clamp ring to the castellated ring. An alignment chuck is also associated with the grip for precise alignment of the post in the post mounting system.

14 Claims, 5 Drawing Sheets

POST MOUNTING SYSTEM

BACKGROUND OF THE INVENTION

The field of the present invention is structural hardware employed with body mounted camera equipment.

Motion isolating mounting equipment used for mounting a cinematographic camera to a cameraman has been available since the mid 1970's. Such equipment has been designed to very substantially isolate the motion of the supporting body from the camera. At the same time, such systems provide suspending support for a cinematographic camera of substantial weight. Such supported cameras are capable of being lightly guided by the hand of the camraman to exhibit relatively universal motion. A number of patents issued on such early equipment include U.S. Pat. Nos. 4,017,168; 4,156,512; 4,208,028 and 4,394,075.

The load to be carried by such mounting equipment typically includes a tube chassis, or post, with a camera platform at the upper end and batteries and other elements at the other, this assembly being referred to as a sled, and the cinematographic camera atop the platform. The post has a handle for manipulating the assembly. A three-axis gimbal mechanism, the axes being referred to as pan, tilt and roll, is attached to the post near but above the effective center of gravity of the entire assembly including the camera. The gimbal mechanism is supported by the motion isolating mounting equipment. One such assembly including a post and three axis gimbal mechanism is illustrated in U.S. Pat. No. 5,752,112, the disclosure of which is incorporated herein by reference. Motion isolating mounting equipment to carry such an assembly is disclosed in U.S. Pat. Nos. 6,030,130 and 6,347,892, the disclosures of which are incorporated herein by reference.

Because of the weight and bulkiness of such systems, proper set up is both critical and difficult. One area of concern has been the location of the gimbal relative to the center of gravity and center of moments. Some natural righting is desirable. Consequently, the gimbal is typically found slightly above the center of gravity. Obtaining that precise sweet spot can be difficult. Further, certain circumstances and shot sequences may require some adjustment to that position for advantageous effect. Clamps have been employed between the gimbal and the post. Unclamping of the gimbal from the post is typically required for adjustment to the relative location of the gimbal to the center of gravity.

SUMMARY OF THE INVENTION

The present invention is directed to a mounting system for a body mounted camera sled and camera. The mounting system includes a grip with a pan-bearing seat and a passage for a post extending fully through the grip. A post clamp affixes the post within the grip.

In a first separate aspect of the present invention, the post mounting system includes a vernier clamp having a vernier ring and associated nut for small adjustments to the location of the grip relative to the center of gravity of the full assembly supported by the grip.

In a second separate aspect of the present invention, the post mounting system includes a vernier clamp having a vernier ring and associated nut for small adjustments to the relative location of the center of gravity of the full assembly to the grip. The grip further includes an alignment chuck at the camera end of the camera grip which may be employed to insure that the longitudinal axis of the post of the sled is precisely aligned with the pan axis of the gimbal.

In a third separate aspect of the present invention, the post clamp is integral with a vernier ring and nut all employed to position a sled post in the grip.

In a fourth separate aspect of the present invention, any of the foregoing separate aspects may be combined to further advantage.

DETAILED DESCRIPTION OF THE PREFERRED EMBODIMENT

Figure 1:
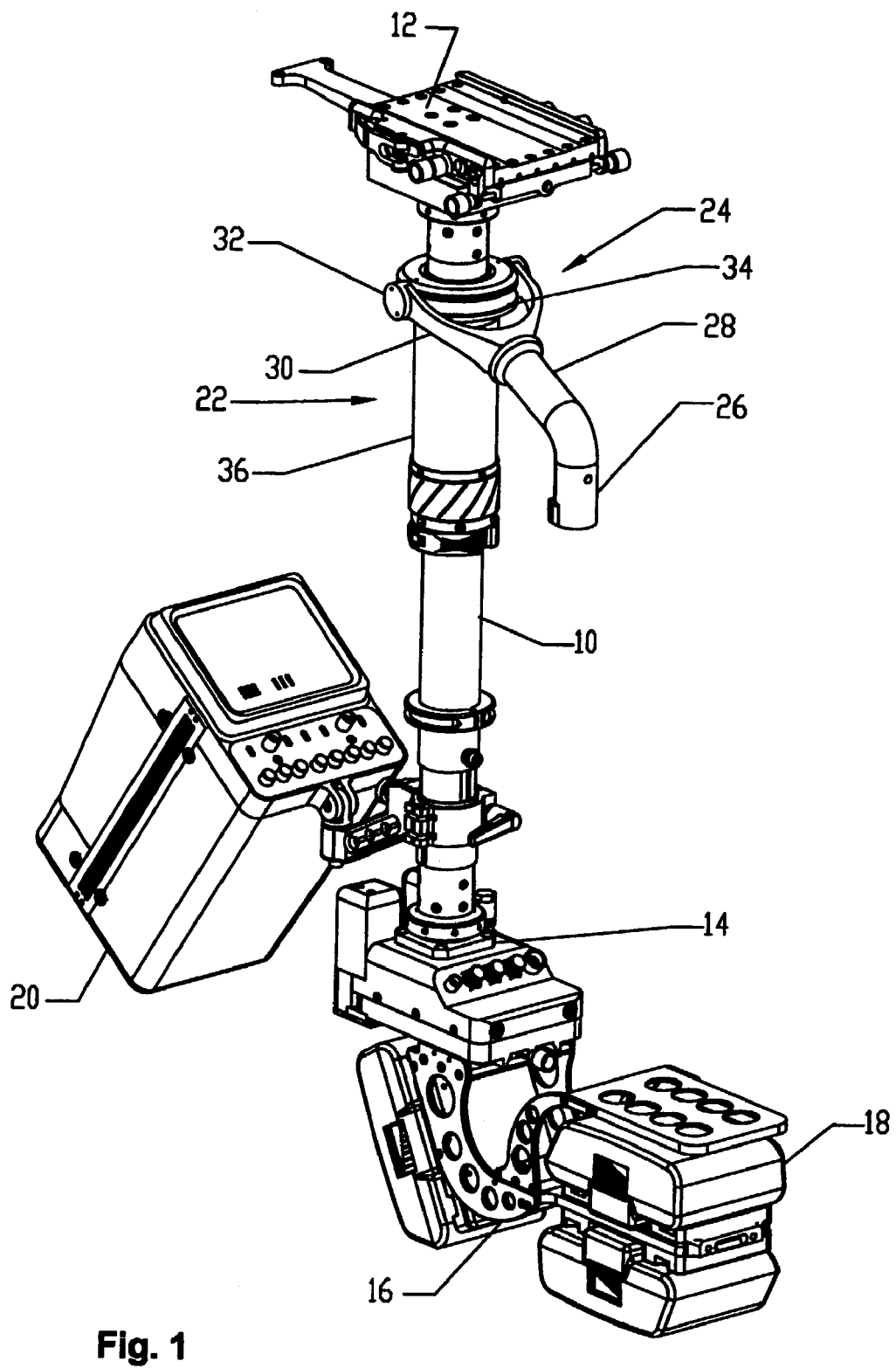
FIG. 1 is a perspective view of body mounted camera equipment including a post mounting system and a sled with a camera mount, a video monitor and a battery hanger.
Figure 2:
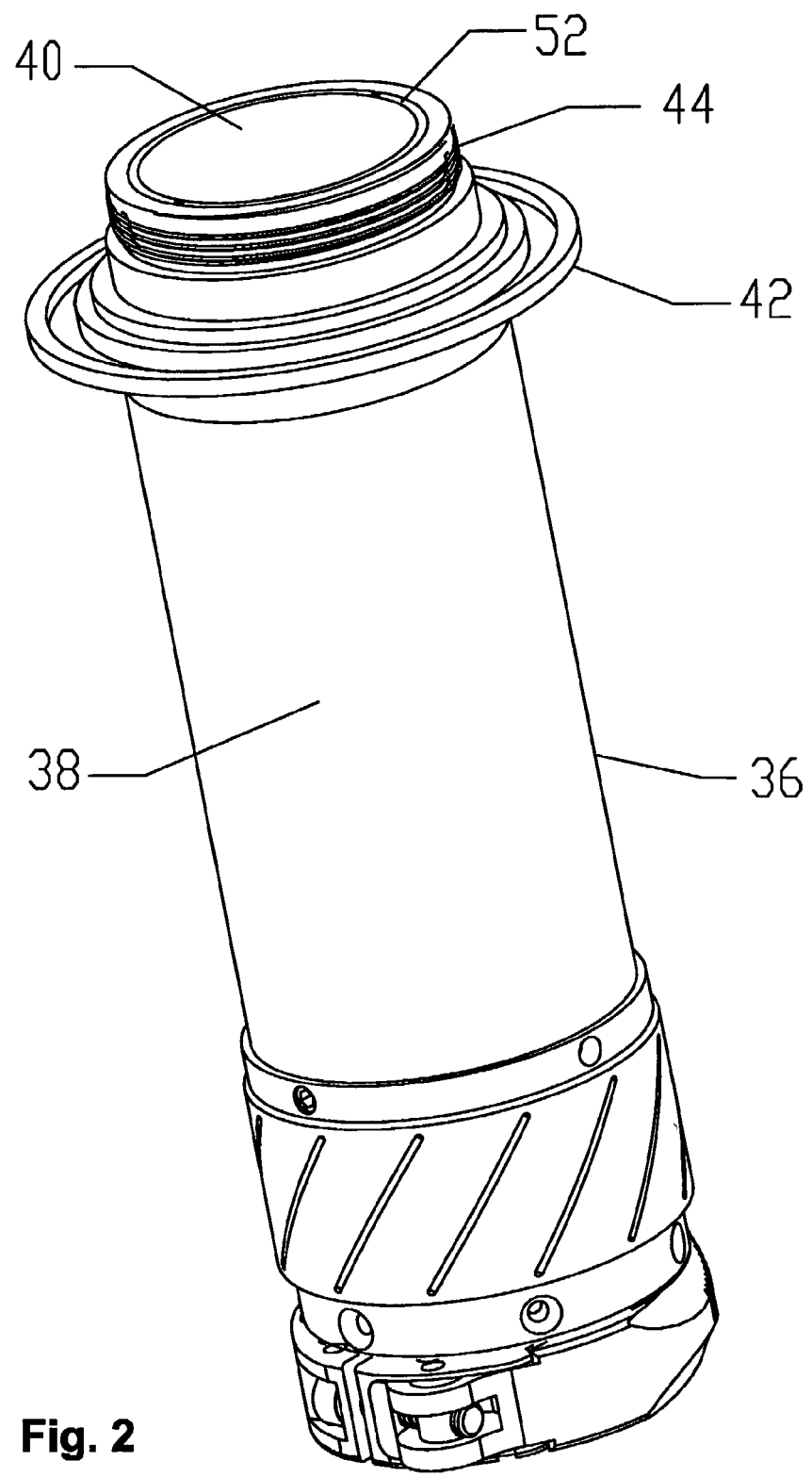
FIG. 2 is a perspective view of the post mounting system.
Figure 3:
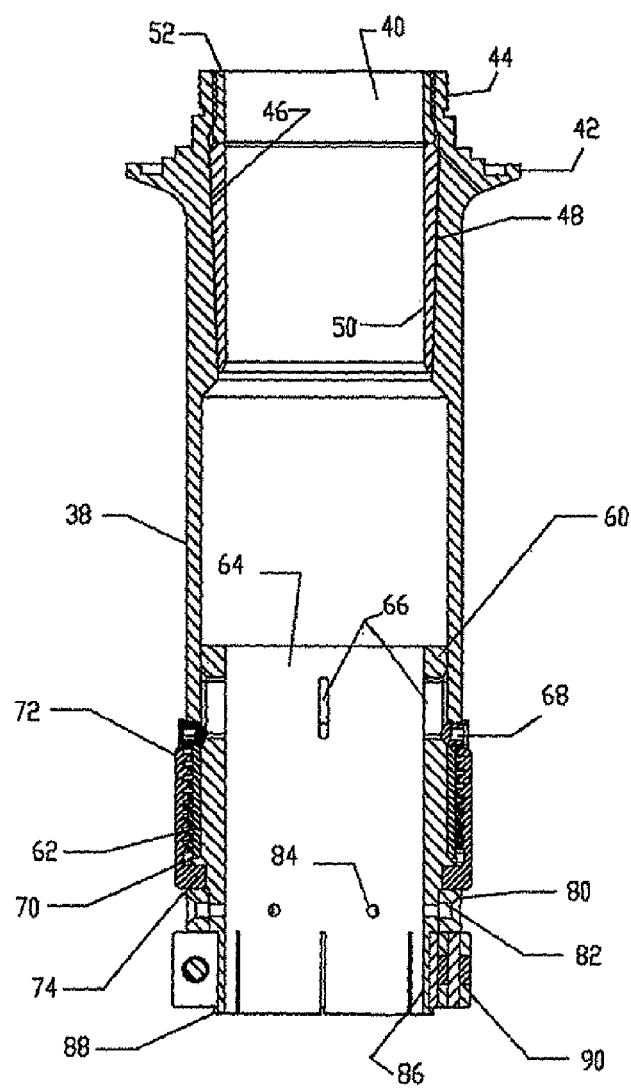
FIG. 3 is a cross-sectional view of the post mounting system taken through the centerline thereof.
Figure 3A:
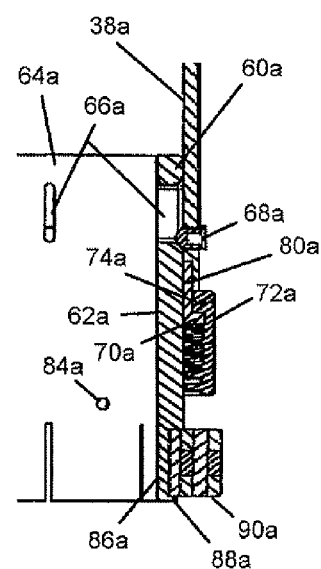
FIG. 3A is a portion of a cross-sectional view of the post mounting system taken through the centerline thereof showing a second embodiment.
Figure 4:
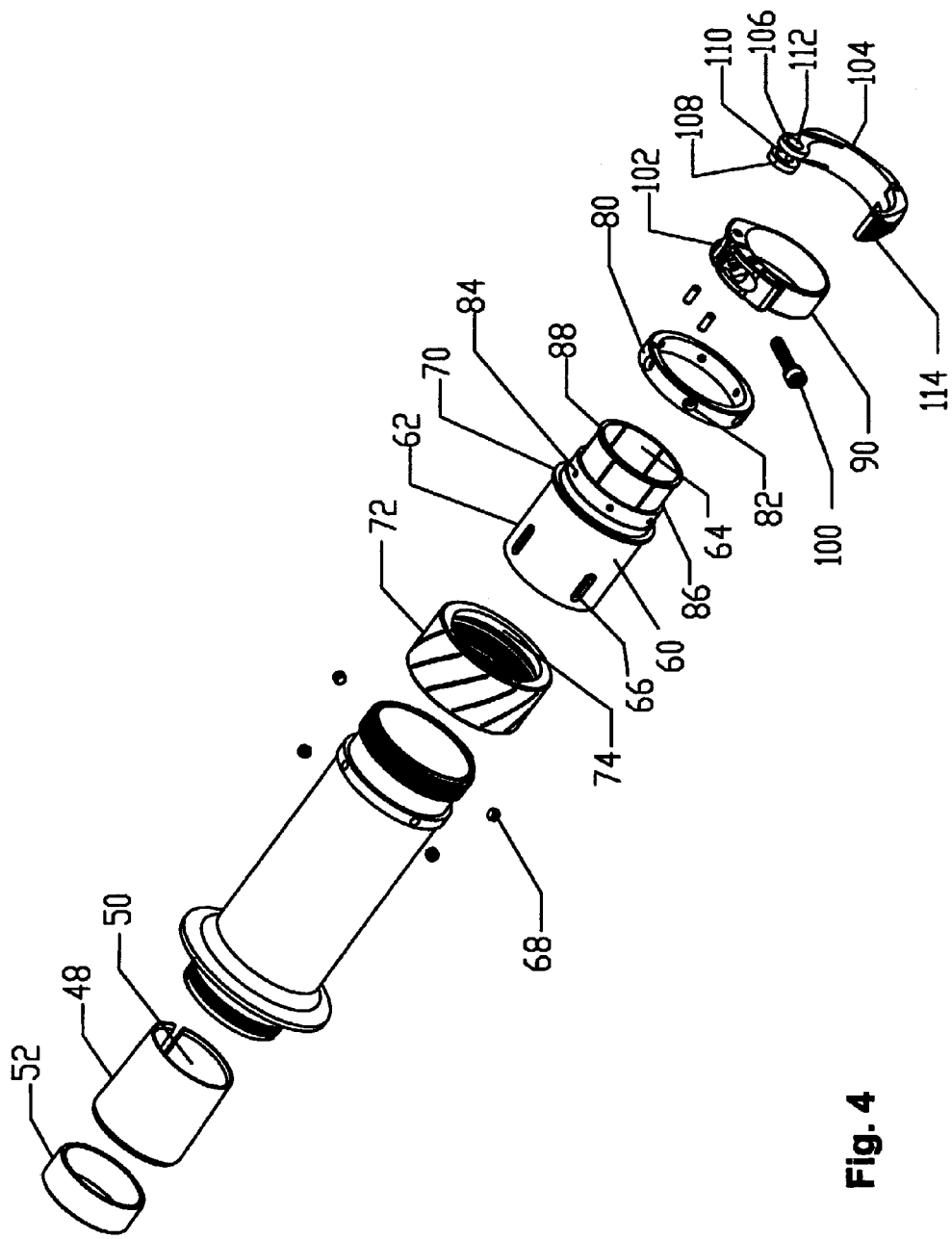
FIG. 4 is an exploded assembly perspective view of the post mounting system.
Figure 5:
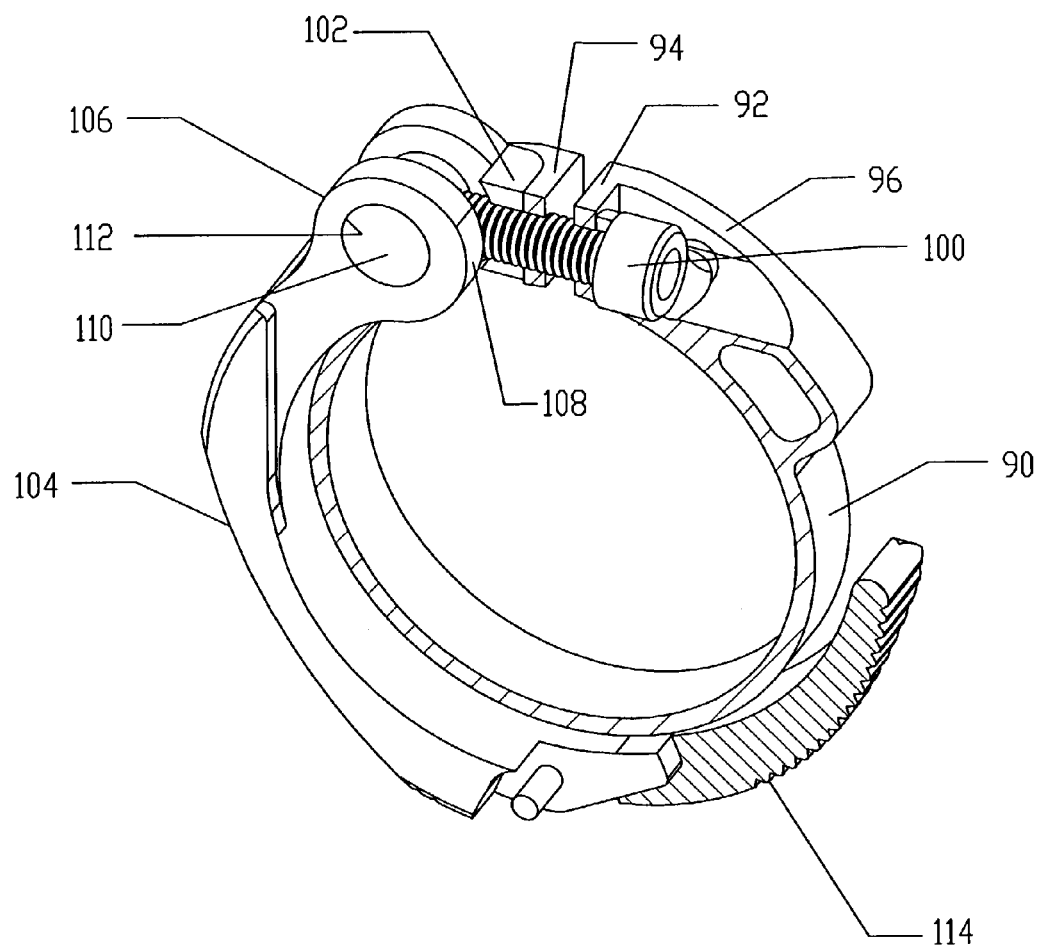
FIG. 5 is a cross-sectional view of the clamp taken through the center of the device normal to the centerline.

Turning in detail to the drawings, a post mounting system is illustrated in context in FIG. 1 as part of a sled for body mounted camera equipment. The sled includes a central post 10 having a camera mount 12 affixed atop the post 10. A mount 14 is affixed at the bottom of the post 10 and is shown to include a battery hanger 16 with batteries 18. A video monitor 20 is also mounted to the post 10 by clamping means.

A post mounting system, generally designated 22, is located about the post 10. A gimbal, generally designated 24, is assembled in conventional fashion for such devices, including a fitting 26 having a socket therein to receive a supporting body mounted camera arm (not shown). A roll bearing 28 is arranged between the fitting 26 and a fork 30. The fork 30 supports tilt bearings 32 to either side of the post mounting system 22. A pan bearing 34 is positioned within the fork 30 in the tilt bearings 32.

The post mounting system 22 includes a grip 36. The grip 36 provides a place for the operator to hold the post 10 for controlling roll, tilt and pan as well as horizontal displacement for a camera mounted to the camera mount 12. The grip includes a generally cylindrical body 38 having a passage 40 therethrough. A pan bearing seat 42 is located near the upper end of the body 38. External threads 44 are employed with the pan-bearing seat 42 to mount the conventional gimbal assembly.

An alignment chuck is arranged at the upper end of the body 38 in the passage 40. A tapered surface 46 is defined on the wall of the passage 40. A split collar 48 is arranged to be retained within the tapered surface 46 in the passage 40. The outer surface of the split collar 48 is also tapered while the inner surface 50 of the collar 48 is substantially cylindrical. Thus, the split collar 48 will mate with the tapered surface 46 in the passage 40 and will provide a cylindrical passage defined by the inner surface 50 for fitting about the post 10. As the split collar 48 is moved axially relative to the tapered surface 46, the inner cylinder defined by the inner surface 50 will increase and decrease in diameter. The collar 48 is of spring material to accommodate adjustments which might be impregnated with PTFE for movement relative to the post 10.

A locating nut 52 abuts against the split collar 48 and has outer threads thereabout. The passage 40 of the body 38 includes internal threads such that the locating nut 52 can be positioned and forced along the tapered surface 46 to match the diameter of a post 10 mounted therein. This alignment chuck is not intended to tightly grip the post 10 as it would otherwise resist vernier operation. Rather, it is designed to accommodate some adjustment for minimizing clearance between the post 10 and the inner surface 50 of the split collar 48 in order to facilitate precise alignment of the longitudinal axis of the post 10 with the longitudinal axis of the post mounting system 22. Two small holes are located on the end of the nut 52 to receive a wrench having two pins for proper advancement of the nut 52.

A vernier clamp is located at the lower end of the body 38. A vernier ring 60 includes a cylindrical body 62 which extends within the lower end of the passage 40. A passage 64 also accommodates a post 10 extending through the grip 36. The body 62 includes longitudinally aligned slots 66. Set screws 68 extend inwardly through the body 38 of the grip 36 into the passage 40 to fit within the slot 66. Consequently, the cylindrical body 62 of the vernier ring 60 is slidable axially through the distance provided by the slot 66. The body 62 is fixed angularly by the set screws 68.

An annular flange 70 extends about the cylindrical body 62. This annular flange 70 accommodates a vernier nut 72. The vernier nut 72 includes an inwardly extend flange 74 which abuts against the annular flange 70 on the vernier ring 60. Thus, the vernier nut 72 is fixed axially relative to the vernier ring 60. The vernier nut 72 also includes internal threads which threadably engage external threads on the lower end of the grip 36. A retaining ring 80 is arranged on the vernier ring 60 adjacent to the annular flange 70. The retaining ring 80 is placed using screws radially extending through holes 82 in the ring 80 to engage tapped holes 84 in the body 62 of the vernier ring 60. The space between the retaining ring 80 and the annular flange 70 accommodates the inwardly extending flange 74 to axially constrain the vernier nut 72 in both axial directions. Rotation of the vernier nut 72 thus can provide fine adjustment to the positioning of the vernier ring 60 within the passage 40 of the grip 36.

In an embodiment with the attachments reversed, a flange at the lower end of the body 38a accommodates a vernier nut 72a. The vernier nut 72a includes an inwardly extend flange 74a which abuts against the flange at the lower end of the body 38a. Thus, the vernier nut 72a is fixed axially relative to the body 38a. The vernier nut 72a also includes internal threads which threadably engage external threads on the vernier ring 60a. A retaining ring 80a is arranged on the body 38a and has a flange 70a adjacent to the inwardly extending flange 74a. The retaining ring 80a may be placed using screws radially extending through holes in the retaining ring 80a to engage tapped holes in the body 38a or the retaining ring 80a may be threaded onto the flange at the lower end of the body 38a as shown. The space between the flange at the lower end of the body 38a and the annular flange 70a accommodates the inwardly extending flange 74a to axially constrain the vernier nut 72a in both axial directions. Rotation of the vernier nut 72a thus can provide fine adjustment to the positioning of the vernier ring 60a within the passage of the body 38a.

A post clamp is associated with the end of the vernier ring 60 with an integrally formed castellated ring 86. The slots of the castellated ring 86 provide flexibility to the elements of the ring and spacing to accommodate compression. A bead 88 on the distal ends of the elements creates a seat for positioning of a clamp.

A clamp ring 90 is thin walled for flexibility and is split with axially and radially extending anchor elements 92 and 94 to either side of the split. Gussets 96 to either side of the anchor elements 92 and 94 provide added strength thereto. The anchor element 92 receives a tie in the form of a bolt 100 extending across the split. The head of the bolt 100 is retained by the anchor element 92. Adjacent the anchor element 94, a thrust washer 102 defines a curved seat and allows the bolt 100 to pass therethrough.

A cam lever 104 includes lugs 106 having rounded cam surfaces 108. The rounded cam surfaces 108 are positioned against the thrust washer 102. A trunnion 110 extends through holes 112 in the lugs 106. The holes 112 are offset from the center of curvature of the rounded cam surfaces 108. The bolt 100 extends to and engages the trunnion 110 between the lugs 106. Rotation of the cam lever 104 thus causes the split to narrow as the cam lever 104 is brought to against the clamp ring 90. Adjustment of the bolt 100 is undertaken to cause the post clamp to appropriately grip the post 10 when the cam lever 104 is closed against the clamp ring 90 so as to compress the castellated ring 86 thereagainst.

The cam lever 104 includes a lever tip 114 which is pivotally mounted to the free end of the cam lever 104. A torsion spring retains the lever tip 114 against the clamp ring 90 when the cam lever 104 is also against the clamp ring 90. The lever tip 114 can be drawn outwardly manually to provide a grip for opening the clamp by swinging the cam lever 104 away from the clamp ring 90.

In operation, the gimbal 24 is assembled with the post mounting system 22 on the post 10. When assembled with a cinematographic camera, the mounting assembly is adjusted by appropriately placing the post mounting system 22 longitudinally on the post 10. In this location, the cam lever 104 is closed against the clamp ring 90. If the clamp is either too tight or too loose, adjustments can be made using the bolt 100 and the lever 104 again locked against the clamp ring 90. The vernier nut 72 may then be rotated in threaded engagement with the external threads 78 on the grip 36. This adjusts the grip longitudinally along the post 10 to accommodate fine tuning and changes in requirements for the grip 36.

Thus, an improved post mounting system is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A post mounting system for a body mounted camera mounting system, comprising:
   a grip including a upper end, a lower end, a pan bearing seat near the upper end and a passage extending fully through the grip from the upper end to the lower end;
   a clamp at the lower end of the grip, the clamp comprising an adjustment ring slidable axially and fixed angularly in the passage and having a post bore extending fully therethrough, a nut rotatably mounted and axially fixed on one of the adjustment ring and the grip and threadably engaged with the other of the adjustment ring and the grip, and a post clamp axially fixed relative to the adjustment ring, the post clamp having a castellated ring axially fixed relative to the adjustment ring and a clamp ring thereover.

2. The post mounting system of claim 1, further comprising:
   a pan bearing mounted in the pan bearing seat;
   a mounting fork including a tilt bearing fixed to the pan bearing;
   a roll bearing fixed to the mounting fork, the pan, tilt and roll bearings having intersecting axes.

3. The post mounting system of claim 1, the castellated ring being integral with the adjustment ring.

4. The post mounting system of claim 1, the nut being rotatably mounted and axially fixed on the adjustment ring.

5. The post mounting system of claim 1, the grip including a manual gripping surface between the upper end and the lower end.

6. A post mounting system for a body mounted camera mounting system, comprising:
   a grip including a upper end, a lower end, a pan bearing seat near the upper end and a passage extending fully through the grip from the upper end to the lower end;
   an alignment chuck at the upper end of the grip;
   a clamp at the lower end of the grip, the clamp comprising a ring slidable axially and fixed angularly in the passage and having a post bore extending fully therethrough, a nut rotatably mounted and axially fixed on one of the ring and the grip and threadably engaged with the other of the ring and the grip, and a post clamp axially fixed relative to the ring, the alignment chuck including a tapered surface in the passage, a split collar and a locating nut abutting against an end of the collar and threadably engaged with the grip.

7. The post mounting system of claim 6 further comprising
   a pan bearing mounted ink pan bearing seat;
   a mounting fork including a tilt bearing fixed to the pan bearing;
   a roll bearing fixed to the mounting fork, the pan, tilt and roll bearings having intersecting axes.

8. The post mounting system of claim 6, the nut being rotatably mounted and axially fixed on the adjustment ring.

9. A post mounting system for a body mounted camera mounting system, comprising:
   a grip including a upper end, a lower end, a pan bearing seat near the upper end and a passage extending fully through the grip from the upper end to the lower end;
   an alignment chuck at the upper end of the grip and including an inner surface in the passage capable of being increased and decreased in diameter;
   a clamp at the lower end of the grip, the clamp comprising an adjustment ring slidable axially and fixed angularly in the passage and having a post bore extending fully therethrough, a nut rotatably mounted and axially fixed on one of the adjustment ring and the grip and threadably engaged with the other of the adjustment ring and the grip, and a post clamp axially fixed relative to the adjustment ring, the post clamp having a castellated ring axially fixed relative to the adjustment ring and a clamp ring thereover.

10. The post mounting system of claim 9, the clamp ring being split and the post clamp further having a tie across the clamp ring split and a cam lever retaining one end of the tie to tighten the tie with pivotal motion of the cam lever.

11. The post mounting system of claim 9, the castellated ring being integral with the adjustment ring.

12. The post mounting system of claim 9, the alignment chuck including a tapered surface in the passage, a split collar and a locating nut abutting against an end of the collar and threadably engaged with the grip.

13. A post mounting system for a body mounted camera mounting system, comprising:
   a grip including a upper end, a lower end, a pan bearing seat near the upper end and a passage extending fully through the grip from the upper end to the lower end;
   a clamp at the lower end of the grip, the clamp comprising an adjustment ring slidable axially and fixed angularly in the passage and having a post bore extending fully therethrough, a nut rotatably mounted and axially fixed on one of the adjustment ring and the grip and threadably engaged with the other of the adjustment ring and the grip, and a post clamp axially fixed relative to the adjustment ring, the post clamp having a castellated ring axially fixed relative to the adjustment ring and a clamp ring thereover, the clamp ring being split and the post clamp further having a tie across the clamp ring split and a cam lever retaining one end of the tie to tighten the tie with pivotal motion of the cam lever.

14. The post mounting system of claim 13 further comprising
   a pan bearing mounted in the pan bearing seat;
   a mounting fork including a tilt bearing fixed to the pan bearing;
   a roll bearing fixed to the mounting fork, the pan, tilt and roll bearings having intersecting axes.

* * * * *

UNITED STATES PATENT AND TRADEMARK OFFICE
CERTIFICATE OF CORRECTION

| | |
|---|---|
| PATENT NO. | : 7,371,028 B2 |
| APPLICATION NO. | : 10/423479 |
| DATED | : May 13, 2008 |
| INVENTOR(S) | : Gordon et al. |

It is certified that error appears in the above-identified patent and that said Letters Patent is hereby corrected as shown below:

In claim 7 (Column 5, line 36), delete "ink" and insert -- in the -- therefor.

Signed and Sealed this

Fifteenth Day of July, 2008

JON W. DUDAS
*Director of the United States Patent and Trademark Office*